(12) United States Patent
Meis et al.

(10) Patent No.: US 9,177,212 B2
(45) Date of Patent: Nov. 3, 2015

(54) METHOD FOR COMBINING A ROAD SIGN RECOGNITION SYSTEM AND A LANE DETECTION SYSTEM OF A MOTOR VEHICLE

(75) Inventors: Urban Meis, Lindau (DE); Christian Gutmann, Frankfurt (DE); Matthias Schorn, Kleinwallstadt (DE); Steen Kristensen, Lindenberg im Allgaeu (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 261 days.

(21) Appl. No.: 13/704,364

(22) PCT Filed: Mar. 19, 2011

(86) PCT No.: PCT/DE2011/000295
§ 371 (c)(1),
(2), (4) Date: Jan. 10, 2013

(87) PCT Pub. No.: WO2011/157251
PCT Pub. Date: Dec. 22, 2011

(65) Prior Publication Data
US 2013/0101174 A1  Apr. 25, 2013

(30) Foreign Application Priority Data
Jun. 15, 2010  (DE) .......... 10 2010 023 791

(51) Int. Cl.
*G06K 9/00* (2006.01)
*G08G 1/0967* (2006.01)
(Continued)

(52) U.S. Cl.
CPC ........ *G06K 9/00798* (2013.01); *G08G 1/09623* (2013.01); *G08G 1/096716* (2013.01); *G08G 1/096775* (2013.01); *G08G 1/16* (2013.01); *G08G 1/167* (2013.01)

(58) Field of Classification Search
None
See application file for complete search history.

(56) References Cited

U.S. PATENT DOCUMENTS

| 6,560,529 B1 | 5/2003 | Janssen |
| 8,144,033 B2 | 3/2012 | Chinomi et al. |

(Continued)

FOREIGN PATENT DOCUMENTS

| DE | 199 48 734 | 4/2001 |
| DE | 103 11 240 | 9/2004 |

(Continued)

OTHER PUBLICATIONS

International Search Report of the International Searching Authority for International Application PCT/DE2011/000295, mailed Jul. 22, 2011, 3 pages, European Patent Office, HV Rijswijk, Netherlands.

(Continued)

*Primary Examiner* — Nirav G Patel
(74) *Attorney, Agent, or Firm* — W. F. Fasse

(57) ABSTRACT

A method combines a road sign recognition system and a lane detection system of a motor vehicle. The road sign recognition system generates road sign information from sensor data of a camera-based or video-based sensor system and the lane detection system generates lane course information from the sensor data. Meaning-indicating data for road signs are generated from the lane course information, and are used to check the plausibility of and/or to interpret the road sign information. Data indicating the course of the lane are generated from the road sign information, and are used to check the plausibility of and/or to interpret the lane course information.

17 Claims, 1 Drawing Sheet

(51) Int. Cl.
*G08G 1/16* (2006.01)
*G08G 1/0962* (2006.01)

(56) References Cited

U.S. PATENT DOCUMENTS

| | | | |
|---|---|---|---|
| 8,995,723 B2 | 3/2015 | Stein et al. | |
| 2005/0232469 A1* | 10/2005 | Schofield et al. | 382/104 |
| 2007/0050134 A1* | 3/2007 | Hayashida et al. | 701/209 |
| 2009/0312888 A1 | 12/2009 | Sickert et al. | |
| 2012/0083960 A1* | 4/2012 | Zhu et al. | 701/23 |
| 2012/0245832 A1 | 9/2012 | Meis et al. | |

FOREIGN PATENT DOCUMENTS

| | | |
|---|---|---|
| DE | 103 43 941 | 5/2005 |
| DE | 102005052175 | 5/2007 |
| DE | 102006023544 | 11/2007 |
| DE | 102007002562 | 7/2008 |
| DE | 102007010013 | 9/2008 |
| DE | 102009036196 | 5/2010 |
| DE | 102009039450 | 5/2010 |
| EP | 1 114 371 | 7/2001 |
| EP | 1 503 354 | 2/2005 |
| EP | 2 093 738 | 8/2009 |
| EP | 2 116 984 | 11/2009 |
| EP | 2 383 713 | 11/2011 |
| WO | WO2005090918 | 9/2005 |
| WO | WO 2008/135604 | 11/2008 |

OTHER PUBLICATIONS

PCT International Preliminary Report on Patentability including English Translation of PCT Written Opinion of the International Searching Authority for International Application PCT/DE2011/000295, issued Dec. 19, 2012, 10 pages, International Bureau of WIPO, Geneva, Switzerland.

* cited by examiner

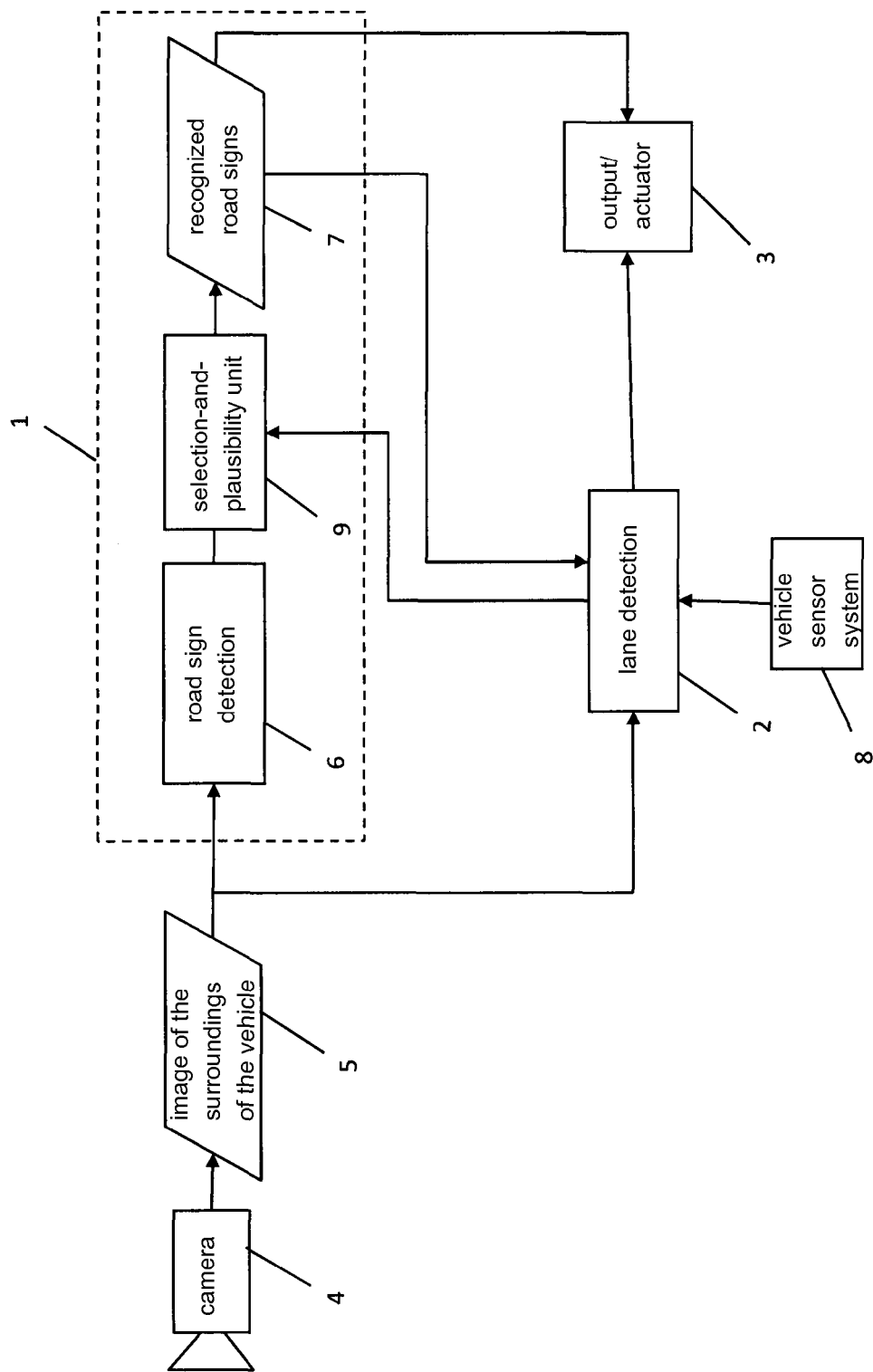

METHOD FOR COMBINING A ROAD SIGN RECOGNITION SYSTEM AND A LANE DETECTION SYSTEM OF A MOTOR VEHICLE

TITLE OF THE INVENTION

1. Field of the Invention

The invention relates to a method for combining a road sign recognition system and a lane detection system of a motor vehicle.

2. Background Information

Modern driver assistance systems assist the driver in driving his or her vehicle. A great number of such systems are based on, e.g., lane detection and road sign recognition. Lane departure warning, lane assignment for longitudinal control systems or a function for intervening in the steering process for the purpose of lane keeping can be realized by means of robust and reliable lane detection.

Such lane detection systems and road sign recognition systems are usually based on camera systems (in particular, on video camera systems) that are fastened to the interior mirror of the motor vehicle or to exterior mirrors thereof.

The fact that such driver assistance systems obtain additional information from a navigation system and/or various driver assistance systems in order to reduce the number of assignment errors or ambiguities is known.

For example, DE 10 2009 036 196 A1 describes a road sign recognition method for a vehicle, in which method road signs are searched for and detected in a region surrounding the vehicle by means of a camera. For searching for the road signs in the surroundings of the vehicle, map data of a navigation system are used as well as search regions for searching for the road signs in the surroundings are preselected and/or limited on the basis of lane data of a lane detection system and/or on the basis of a respective position of the road signs relative to the camera, said respective relative position being estimated by means of a sensor device.

Furthermore, according to a method known from DE 199 48 734 A1, lane detection is performed by means of a camera, wherein these data are supplied to an analyzing computer. Navigation data and current lane detection data can be correlated in a location-related manner by means of said analyzing computer. In this way, the electronically mapped and/or predictively known route data can be verified during driving by permanent lane checking. Furthermore, the image data of the camera are also subjected to road sign recognition so that the current result data of the lane checking process and the route data are correlated with the current data of a camera-based electronic road sign recognition.

However, the functionality of such driver assistance systems may be restricted if the navigation-based data are not available, i.e., if the additional input signals of a satellite-based navigation system are not available to these systems.

SUMMARY OF THE INVENTION

The object of the invention is to advance a method of the type mentioned at the beginning in such a manner that both the road sign recognition system and the lane detection system become more robust and more reliable and the service quality of these two systems is improved without having to use information from a digital map or from a satellite-based navigation system.

The method according to an embodiment of the invention is characterized by the features that meaning-indicating data for road signs are generated from the lane course information, that these meaning-indicating data for road signs are used to check the plausibility of and/or to interpret the road sign information, that furthermore data indicating the course of the lane are generated from the road sign information, and that these data indicating the course of the lane are used to check the plausibility of and/or to interpret the lane course information.

In this way, lane detection provides information that is also relevant to the validity of road signs, i.e., that is used for meaning analysis or interpretation. The other way round and similarly, the information about recognized road signs is used for lane detection.

According to a realization of the invention, a plausibility check of or an interpretation of a road sign recognized by means of the road sign recognition system is performed using lane-course-indicating data in order to ensure that a recognized road sign is relevant to the lane the vehicle is traveling in, i.e., is relevant to the driver and must therefore be observed by the driver.

For this purpose, information about the line structure of the fast lane of a pavement is preferably generated from the lane course information as meaning-indicating data for road signs, and the plausibility of road signs indicating a restriction on passing and recognized by the road sign recognition system is checked using this information about the line structure.

According to a further advantageous realization of the invention, information indicating an exit ramp or an exit ramp region is generated from the lane course information as meaning-indicating data for road signs, and the plausibility of road signs indicating a speed limit and/or a restriction on passing and recognized by the road sign recognition system is checked using the information indicating this exit ramp or this exit ramp region.

On the one hand, according to a realization of the invention, if the fact that the motor vehicle is driving past the exit ramp is detected in this way from the current lane detected by means of the lane detection system and/or from a lane change of the motor vehicle detected by means of the lane detection system and from the information indicating an exit ramp, those data which concern the recognized road signs indicating a speed limit and/or a restriction on passing and concerning the exit ramp are rejected by the road sign recognition system.

On the other hand, according to a further realization of the invention, if the fact that the motor vehicle is leaving the road is detected from the current lane detected by means of the lane detection system and/or from a lane change of the motor vehicle detected by means of the lane detection system and from the information indicating an exit ramp, road signs indicating a speed limit and/or a restriction on passing and assigned to the exit ramp and recognized by the road sign recognition system are outputted to a Human Machine Interface of the motor vehicle.

According to a further advantageous realization of the inventive method, information indicating an exit ramp or an exit ramp region is generated from the lane course information concerning the current lane of the motor vehicle as meaning-indicating data for road signs, and road signs indicating a speed limit and/or a restriction on passing and recognized by the road sign recognition system are interpreted as being canceled using this information indicating an exit ramp or an exit ramp region.

Furthermore, according to a further development, information indicating an exit ramp or an exit ramp region is generated from the lane course information concerning the current lane as meaning-indicating data for road signs, and the plausibility of road signs that indicate "driving on the right" or "driving on the left" is checked on the basis of the frequency of the detected exit ramps or exit ramp regions.

Finally, according to a realization of the invention, it is furthermore advantageous to generate construction-site-indicating information from the lane course information concerning the current lane as meaning-indicating data for road signs and to check the plausibility of road signs indicating a speed limit and/or a restriction on passing and recognized by the road sign recognition system using the information indicating a construction site.

According to an advantageous realization of the invention, the support for the lane detection system by the road sign recognition system consists in the following: Construction-site-indicating information is generated from the road sign information generated by the road sign recognition system as data indicating the course of the lane, and the sensor data are analyzed for particular lane course scenarios and/or for indicators for particular lane course scenarios, said analysis being performed by means of the lane detection system on the basis of the construction-site-indicating information. In this way, the information about construction site signs recognized by the road sign recognition system may be used to analyze the image information as indicators for particular lane course scenarios with regard to particular road markings (in particular, yellow road markings), said analysis being performed by means of the lane detection system.

According to a further advantageous realization of the inventive method, information indicating road signs indicating a speed limit and/or the road type is generated from the road sign information generated by the road sign recognition system as data indicating the course of the lane, and the information indicating road signs indicating a speed limit and/or the road type is analyzed for road-type-indicating features by means of the lane detection system or the plausibility of the identified road types is checked.

Finally, according to a preferred further development of the invention, it is particularly advantageous to generate information indicating road signs indicating a speed limit and/or the road type from the road sign information generated by the road sign recognition system as data indicating the course of the lane and to adjust the filter dynamics of a filter of the lane detection system for generating a lane course scenario, said adjustment being performed using this information that indicates road signs indicating a speed limit and/or the road type.

BRIEF DESCRIPTION OF THE DRAWINGS

In order that the invention may be clearly understood, an example embodiment thereof will now be described with reference to a single accompanying drawing figure, showing a schematic block diagram of a motor vehicle's driver assistance system in which the example embodiment of the inventive method can be carried out.

DETAILED DESCRIPTION OF AN EXAMPLE EMBODIMENT OF THE INVENTION

In the following, the invention will be explained in greater detail with reference to a single FIG. 1. Said FIG. 1 shows a schematic block diagram of a driver assistance system of a motor vehicle. Said driver assistance system is made up of a road sign recognition system 1 and a lane detection system 2. Said motor vehicle is not shown.

Said driver assistance system also comprises a video camera 4 with a downstream storage unit 5. The image data of the surroundings of the motor vehicle acquired by the camera 4 are stored in the form of images in said storage unit 5. Said camera 4 covers the region in front of the motor vehicle and is usually arranged on the interior mirror of the motor vehicle. In addition or alternatively, one camera 4 each may be mounted on the exterior mirrors in order to be able to cover the regions at the sides of the motor vehicle.

The image data of the storage unit 5 are supplied to both the road sign recognition system 1 and the lane detection system 2.

The road sign recognition system 1 detects and classifies road signs from the image data by means of a detector 6 according to prior-art methods. A downstream selection-and-plausibility unit 9 checks the plausibility of or selects said road signs before they are stored as recognized road signs in an output storage 7. This information about recognized road signs is then available to an output unit 3 as a Human Machine Interface, e.g., a central display or a display of an instrument cluster, for indication to the driver of the motor vehicle. It is also possible to derive therefrom warnings or vehicle interventions by means of an actuator unit 3.

The lane course of the current lane and the lane courses of adjacent lanes (such as fast lane, opposite lane or exit lane) are detected from the image data of the storage unit 5 by means of the lane detection system 2 and analyzed together with the data of a vehicle sensor system 8 that detects the ego-motion of the vehicle (longitudinal velocity, lateral velocity, yaw rate, etc.), and the result is supplied to the output-and-actuator unit 3 in order to similarly derive therefrom visual or acoustic warnings and/or vehicle interventions. The data of the vehicle sensor system 8 are also supplied to other vehicle systems, e.g., to a driver assistance system (Electronic Stability Control, Traction Control System, etc.) of the motor vehicle.

In order to make the camera-based road sign recognition and lane detection system 1 and 2 more robust, the information that is generated by the lane detection system 2 and meaning-relevant to the recognition of the road signs is supplied to the road sign recognition system 1 and—vice versa—the information that is generated by the road sign recognition system 1 and relevant to the course of the lane is made available to the lane detection system 2.

Thus, the plausibility of the road signs recognized by the road sign recognition system 1 can be checked by means of lane information by supplying said lane information to the selection-and-plausibility unit 9, said lane information being provided by the lane detection system 2. If several road signs are recognized, the road sign that is relevant to the lane the motor vehicle is traveling in can be selected by means of the supplied lane information. It is also possible to check the plausibility of or to interpret a recognized road sign by means of the supplied lane information, i.e., to determine whether the recognized road sign is relevant to the lane the motor vehicle is traveling in and must therefore be observed by the driver of the motor vehicle.

An example thereof is the recognition of a road sign indicating a restriction on passing by the road sign recognition system 1 and the plausibility check of said road sign on the basis of the detection of a continuous line structure or of a line structure that is to be interpreted as a continuous line structure between the lane the motor vehicle is traveling in and the adjacent fast lane.

Furthermore, the plausibility of speed limit signs located in exit ramp regions and only being relevant to the exit ramp regions can be checked on the basis of the exit ramp and/or exit lane detected by the lane detection system 2.

If, in such a case, the fact that the motor vehicle is driving past the exit ramp is detected from the current lane detected by means of the lane detection system 2 and/or from a lane change of the motor vehicle detected by means of the lane detection system 2 and from the exit-ramp-indicating information of the lane detection system 2, those data which concern recognized road signs indicating a speed limit and/or a restriction on passing and concerning the exit ramp are rejected by the road sign recognition system 1, i.e., the road sign data are not stored in the output storage 7 by the selection-and-plausibility unit 9.

The lane change indicating that the motor vehicle is driving past an exit ramp is determined by detecting the fact that the middle of the vehicle is crossing a road marking or by a detected change of direction of the motor vehicle on the basis of the yaw angle of the vehicle with respect to the current lane.

Furthermore, the fact that the motor vehicle is driving past an exit ramp can be detected on the basis of a change of the type of the right-hand road marking that changes from a continuous line to a broken line. The detection of a direction indicator signal would also be suitable for this purpose.

If, however, the motor vehicle is not detected to be driving past the exit ramp but the fact that the motor vehicle is leaving the road is detected from the current lane detected by means of the lane detection system 2 and/or from a lane change of the motor vehicle detected by means of the lane detection system 2 and from the information indicating an exit ramp, the road signs indicating a speed limit and/or a restriction on passing and assigned to the exit ramp by the selection-and-plausibility unit 9 and recognized by the road sign recognition system 1 are outputted (e.g., as a visual or acoustic warning) via the output storage 7 to a Human Machine Interface 3 of the motor vehicle. This may also be used to activate actuators of a vehicle assistance system in order to initiate a vehicle intervention (e.g., reducing the speed of the motor vehicle).

Video-based exit ramp detection is performed by, e.g., covering the further surroundings of the motor vehicle by means of the video camera 4 in order to detect the beginning and the end of the exit lane. In addition, exit ramp markings detected by the lane detection system 2 may be used for the plausibility check. As features or indicators for exit ramp detection, the exit lane and the current lane are detected to be non-parallel or the types of the markings are detected and analyzed. At the level of image analysis, exit ramp detection may be performed by detecting an upsilon-like or lambda-like structure.

Furthermore, in connection with exit ramp detection, road signs indicating a speed limit and/or a restriction on passing and recognized by the road sign recognition system 1 may be interpreted as being canceled using the information indicating an exit ramp or an exit ramp region and generated by the lane detection system 2, i.e., these road sign data are not stored in the output storage 7 by the selection-and-plausibility unit 9.

Finally, the information generated by the lane detection system 2 with regard to detected exit ramps may also be used to check, on the basis of the frequency of the detected exit ramps or exit ramp regions, the plausibility of road signs recognized by the road sign recognition system 1 that indicate "driving on the right" or "driving on the left".

Furthermore, the plausibility of speed limit signs may be checked using construction-site-indicating information generated by the lane detection system. It is also possible to infer the existence of a construction site with a speed limit without the previous recognition of a speed limit sign by the road sign recognition system 1. This case may occur if, e.g., such road signs are temporarily covered by motor vehicles ahead. Video-based construction site detection may be performed by, e.g., the detection of crash barriers, crash walls or raised structures as well as of colors of markings.

As mentioned above, also the information about recognized road signs that is generated by the road sign recognition system 1 includes information that is relevant to the course of the pavement, which relevant information is made available to the lane detection system 2 via the output storage 7 of the road sign recognition system 1.

For example, construction-site-indicating information is generated from the road sign information generated by the road sign recognition system 1 as data indicating the course of the lane, whereby the lane detection system 2 is caused to analyze the image data of the storage unit 5 for particular lane course scenarios and/or for indicators for particular lane course scenarios.

For example, narrowing lane markings, additional lane markings or particular colors of lane markings are particular lane course scenarios and/or indicators for particular lane course scenarios.

Said construction-site-indicating information may be, e.g., construction site signs or a succession of speed limit signs causing the driver to gradually reduce the speed. Furthermore, such information of the road sign recognition system 1 may be used to select the right lane boundaries in the construction site region since the construction site markings might cover the usual lane markings.

Finally, said construction-site-indicating information of the road sign recognition system 1 may also be used to disable a lane function (e.g., lane departure warning or lane keeping function) of a driver assistance system of the motor vehicle.

Furthermore, information indicating road signs indicating a speed limit and/or the road type is generated from the road sign information generated by the road sign recognition system 1 as data indicating the course of the lane, and said information indicating road signs indicating a speed limit and/or the road type is analyzed for road-type-indicating features by means of the lane detection system 2 or the plausibility of identified road types is checked. For example, with a detected speed limit of 130 km/h, the plausibility of a country road identified by the lane detection system 2 can be checked. Likewise, with expressway or superhighway signs recognized by the road sign recognition system 1, the plausibility of an identified expressway or of an identified superhighway can be checked by the lane detection system 2.

If information indicating road signs indicating a speed limit and/or the road type is generated from the road sign information generated by the road sign recognition system 1 as data indicating the course of the lane, the filter dynamics of a filter of the lane detection system 2 is adjusted for generating a lane course scenario, said adjustment being performed on the basis of said information that indicates road signs indicating a speed limit and/or the road type.

The invention claimed is:

1. A method for combining a road sign recognition system and a lane detection system of a subject motor vehicle driving along a subject vehicle's lane of a road, comprising the steps:
   a) generating sensor data from a camera-based or video-based sensor system,
   b) providing the sensor data to the road sign recognition system and to the lane detection system,
   c) with the road sign recognition system, generating road sign information regarding a road sign detected in an environment of the road from the sensor data,
   d) with the lane detection system, generating lane course information regarding the subject vehicle's lane from the sensor data,
   e) with the lane detection system, generating first crossover data from the lane course information, f) providing the first cross-over data to the road sign recognition system, and using the first cross-over data to check the plausibility of and/or to interpret the road sign information in the road sign recognition system to thereby select or deselect the road sign information as plausible and/or recognized road sign information, g) with the road sign recognition system, generating second cross-over data from the road sign information, and h) providing the second cross-over data to the lane detection system, and using the second cross-over data to check the plausibility of and/or to interpret the lane course information in the lane detection system to thereby select or deselect the lane course information as plausible and/or recognized lane course information.

2. The method according to claim 1, characterized in that said step f) comprises said checking of the plausibility of the road sign information.

3. The method according to claim 1, characterized in that
said first cross-over data comprises information about a line structure of a fast lane of a pavement of the road, which is generated from the lane course information of the lane detection system, and
said step f) comprises checking the plausibility of the road sign information regarding a road sign indicating a restriction on passing using the information about the line structure.

4. The method according to claim 1, characterized in that
said first cross-over data comprises construction-site-indicating information, which is generated from the lane course information concerning the subject vehicle's lane, and
said step f) comprises checking the plausibility of the road sign information regarding a road sign indicating a speed limit and/or a restriction on passing using the construction-site-indicating information.

5. The method according to claim 1, characterized in that
said second cross-over data comprises construction-site-indicating information, which is generated from the road sign information, and
further comprising performing an analysis of the sensor data for particular lane course scenarios and/or for indicators for particular lane course scenarios, wherein said analysis is performed by the lane detection system based on the construction-site-indicating information.

6. The method according to claim 1, characterized in that
said second cross-over information comprises information indicating road signs indicating a speed limit and/or a road type of the road, which is generated from the road sign information, and
further comprising analyzing the information indicating road signs indicating the speed limit and/or the road type, for road-type-indicating features, by the lane detection system, or checking the plausibility of the identified road type.

7. The method according to claim 1, which is performed without using information from a digital map or from a satellite-based navigation system.

8. The method according to claim 1, wherein the road sign recognition system includes a road sign detection unit, a selection and plausibility unit, and a memory, wherein said checking of the plausibility and/or said interpreting of the road sign information is performed in the selection and plausibility unit, and further comprising storing the plausible and/or recognized road sign information in the memory.

9. A method for combining a road sign recognition system and a lane detection system of a motor vehicle driving along a road, wherein the road sign recognition system generates road sign information from sensor data of a camera-based or video-based sensor system and the lane detection system generates lane course information from said sensor data, characterized in that meaning-indicating data for road signs are generated from the lane course information, the meaning-indicating data for road signs are used to check the plausibility of and/or to interpret the road sign information, data indicating the course of the lane are generated from the road sign information, the data indicating the course of the lane are used to check the plausibility of and/or to interpret the lane course information, the meaning-indicating data for road signs comprises information indicating an exit ramp or an exit ramp region that is generated from the lane course information of the lane detection system, the plausibility of the road sign information regarding particular road signs that indicate a speed limit and/or a restriction on passing and that are recognized by the road sign recognition system is checked using the information indicating the exit ramp or the exit ramp region, and further comprising a first additional feature or a second additional feature, wherein:

according to the first additional feature, a fact that the motor vehicle is remaining on the road and driving past the exit ramp is detected from the current lane detected by the lane detection system and/or from a lane change of the motor vehicle detected by the lane detection system and from the information indicating the exit ramp or the exit ramp region, and the road sign recognition system rejects data of the road sign information regarding the particular road signs that indicate the speed limit and/or the restriction on passing and that concern the exit ramp, or according to the second additional feature, a fact that the motor vehicle is exiting the road onto the exit ramp is detected from the current lane detected by the lane detection system and/or from a lane change of the motor vehicle detected by the lane detection system and from the information indicating the exit ramp or the exit ramp region, and data of the road sign information regarding the particular road signs that indicate the speed limit and/or the restriction on passing and that concern the exit ramp are outputted to a Human Machine Interface of the motor vehicle.

10. The method according to claim 9, comprising said first additional feature.

11. The method according to claim 9, comprising said second additional feature.

12. The method according to claim 9, wherein the particular road signs indicate the restriction on passing.

13. A method for combining a road sign recognition system and a lane detection system of a motor vehicle driving along a road, wherein the road sign recognition system generates road sign information from sensor data of a camera-based or video-based sensor system and the lane detection system generates lane course information from said sensor data, characterized in that meaning-indicating data for road signs are generated from the lane course information, the meaning-indicating data for road signs are used to check the plausibility of and/or to interpret the road sign information, data indicating the course of the lane are generated from the road sign information, the data indicating the course of the lane are used to check the plausibility of and/or to interpret the lane course information, the meaning-indicating data for road signs comprises information indicating an exit ramp or an exit ramp region that is generated from the lane course information of the lane detection system and that concerns a current lane of the road on which the motor vehicle is driving, and further comprising a first additional feature or a second additional feature, wherein:

according to the first additional feature, data of the road sign information regarding particular road signs that indicate a speed limit and/or a restriction on passing are interpreted as being canceled using the information indicating the exit ramp or the exit ramp region, or according to the second additional feature, the plausibility of the road sign information regarding particular road signs that indicate "driving on the right" or "driving on the left" is checked based on a frequency of a detection of exit ramps or exit ramp regions.

14. The method according to claim 13, comprising said first additional feature.

15. The method according to claim 14, wherein the particular road signs indicate the restriction on passing.

16. The method according to claim 13, comprising said second additional feature.

17. A method for combining a road sign recognition system and a lane detection system of a motor vehicle driving along a road, wherein the road sign recognition system generates road sign information from sensor data of a camera-based or video-based sensor system and the lane detection system generates lane course information from said sensor data, characterized in that meaning-indicating data for road signs are generated from the lane course information, the meaning-indicating data for road signs are used to check the plausibility of and/or to interpret the road sign information, data indicating the course of the lane are generated from the road sign information, the data indicating the course of the lane are used to check the plausibility of and/or to interpret the lane course information, the data indicating the course of the lane comprises information that indicates road signs indicating a speed limit and/or a road type of the road, and that is generated from the road sign information, and filter dynamics of a filter of the lane detection system are adjusted to generate a lane course scenario, wherein the adjustment is performed using the information that indicates road signs indicating the speed limit and/or the road type.

\* \* \* \* \*